May 17, 1927. 1,628,704
C. ZARTMAN
SIGHT REFLECTOR AND GLARESHIELD
Filed Oct. 31, 1925
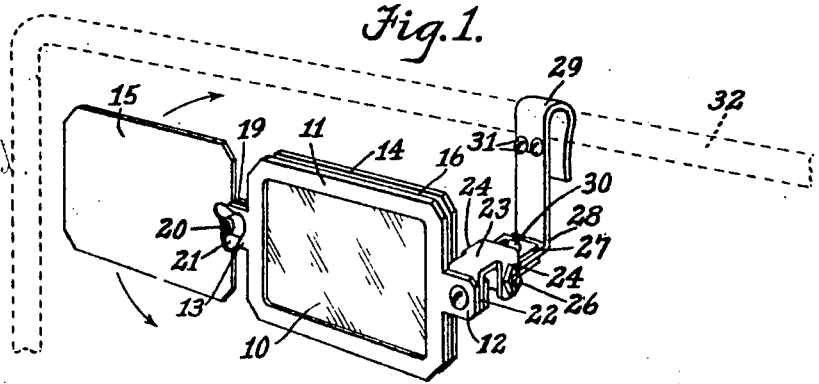
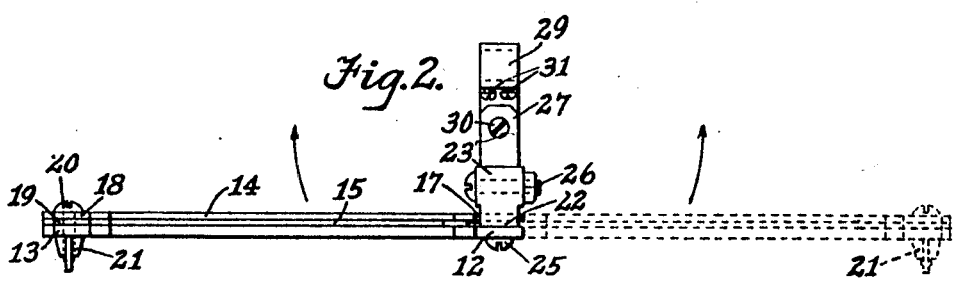
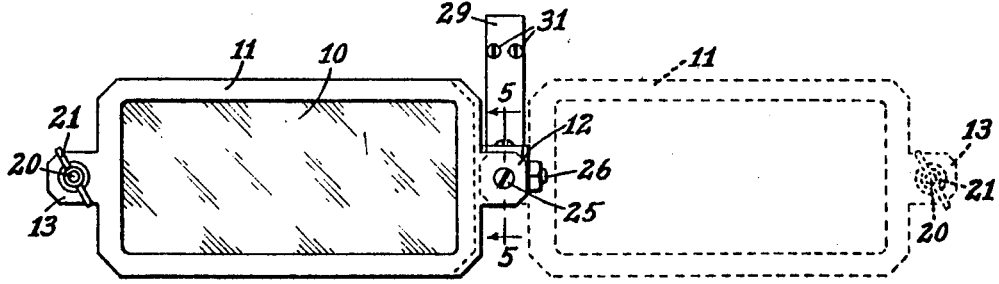
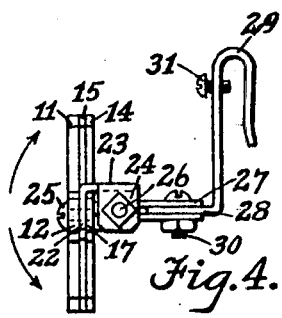
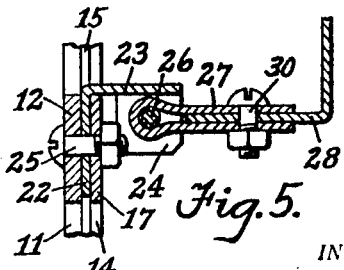
INVENTOR,
Charles Zartman
BY
ATTORNEY.

Patented May 17, 1927.

1,628,704

UNITED STATES PATENT OFFICE.

CHARLES ZARTMAN, OF LOS ANGELES, CALIFORNIA.

SIGHT REFLECTOR AND GLARESHIELD.

Application filed October 31, 1925. Serial No. 65,950.

My invention relates to automobile accessories and more particularly to a device for protecting the eyes of vehicle drivers against excessive light and for enabling them to see toward the rear of their machine, without turning the head.

The primary object of my invention is to provide a combined sight reflector and glare shield which easily may be attached to the windshield of an automobile and which may be fixed in any desired position on the windshield and at any desired angle to the line of sight of the driver.

A further object is to provide a combined sight reflector and glare shield of the character described which is simple and inexpensive in construction, which is durable and which readily may be adjusted.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof:

Fig. 1, is a view in perspective of the preferred form of my combined sight reflector and glare shield, with the glare shield extended, the device being shown as applied to a windshield a fragment of which is indicated in dotted lines.

Fig. 2, is a top edge view of the combined reflector and glare shield shown in Fig. 1, with the glare shield in its folded position.

Fig. 3, is a front view of the device as shown in Fig. 2.

Fig. 4, is a right-hand end view of the device shown in Fig. 3.

Fig. 5, is an enlarged sectional view of the device taken on line 5—5 of Fig. 3.

Considered more in detail the device consists of a mirror 10 set in a frame 11 provided with end lugs 12 and 13, a parallel back plate 14 coinciding in outline with mirror frame 11 which is held in slightly spaced relation thereto and a translucent plate 15 preferably of colored glass or celluloid, which coincides in outline with mirror frame 11 and back plate 14, except that it is somewhat shorter, said translucent plate being adapted to fold into the space 16 between the mirror frame and the back plate, or to be extended from one end thereof at any desired angle thereto. Back plate 14 is provided with end lugs 17 and 18, coinciding with lugs 12 and 13 respectively of mirror frame 11, and translucent plate 15 is provided with one end lug 19, coinciding with lugs 13 and 18 of the mirror frame and back plate respectively. Lug 19 is pivotally held between lugs 13 and 18 by a bolt 20 extending through coinciding apertures in all three of the lugs and a thumbnut 21 on the threaded end of bolt 20 is adapted to clamp the lugs together so that plate 15 cannot turn on pivot bolt 21.

Lug 19 of the translucent plate thus serves as a spacer between one end of mirror frame 11 and back plate 14. The other end is similarly spaced by a right-angled lug 22 formed on one end of a hinge plate 23 having a pair of parallel lateral lugs 24 on its opposite end bent at right angles to the plate so that they lie in planes at right angles to that of lug 22. A horizontal pivot bolt 25 extends through apertures in lugs 12, 17 and 22 whereby lug 22 may be clamped between lugs 12 and 17 to hold mirror frame 11 and back plate 14 in fixed relation to hinge plate 23. A hinge bolt 26 extends through apertures in lugs 24 wherein it is held horizontally but at right angles to pivot bolt 25 and a folded hingeplate 27 is looped around hinge bolt 26 between parallel lugs 24. Hinge plate 27 extends away from hinge bolt 26 in longitudinal alignment with hinge plate 23, its ends being made equal and parallel as shown in Fig. 5, and the bent shank 28 of a flat hook 29 adapted to hook over a windshield, is inserted between said parallel ends of hinge plate 27 and is held therebetween by a vertical pivot bolt 30 extending through apertures in the ends of said hingeplate 27 and hook shank 28. Pivot bolt 30 is therefore maintained at right angles both to hinge bolt 26 and pivot bolt 25 and the three bolts, together with hinge plates 22 and 27, form a universal jointed bracket. A pair of set screws 31, adapted to hold hook 29 rigidly on the windshield, extend through the hook shank near its upper end.

The combined reflector and glare shield is applied to a windshield by slipping hook 29 over the upper frame bar 32 of a windshield at about its middle point and tightening set screws 31 to hold it firmly in place. The mirror frame and back plate may be adjusted in either direction about pivot bolt 30, as indicated by the arrows in Fig. 2, and may be adjusted about the pivot bolt 25 in either the position shown in full lines or the position shown in dotted lines in Figs. 2 and 3, or in any intermediate position within an angle of 180 degrees. They may also be tipped in either direction about hinge bolt 26, as indicated by the arrows in Fig. 4. These various adjustments make it possible to set the device so as to accommodate different positions of the driver and any line of vision for such different positions. Furthermore translucent plate 15 may be adjusted in either direction about pivot bolt 20, as indicated by the arrows in Fig. 1, to serve as an eye shield against the glare of the sun, of street lamps or of lamps on other machines. When not required for such purpose the glare shield may be turned into slot 16 and clamped there so as to be out of the way and out of sight.

Having thus illustrated and described my invention, I claim:

A combined sight reflector and glare shield comprising a mirror fixed in a frame having opposite end lugs thereon and a slot in the back thereof; a translucent plate pivotally attached to one of said end lugs so that it may be swung into said slot or may be extended and fixed at any desired angle to said mirror; a jointed bracket pivotally attached to the other of said end lugs, and a suspending hook pivotally attached to said bracket, said hook being adapted to slip over the top rail of a windshield and said bracket forming a universal joint between said mirror frame and said hook, whereby said mirror may be swung about one horizontal axis to either side of the hook, may be tipped about another horizontal axis to adjust for vertical reflection or may be turned about a vertical axis to adjust for lateral reflection.

CHARLES ZARTMAN.